Patented Jan. 25, 1944

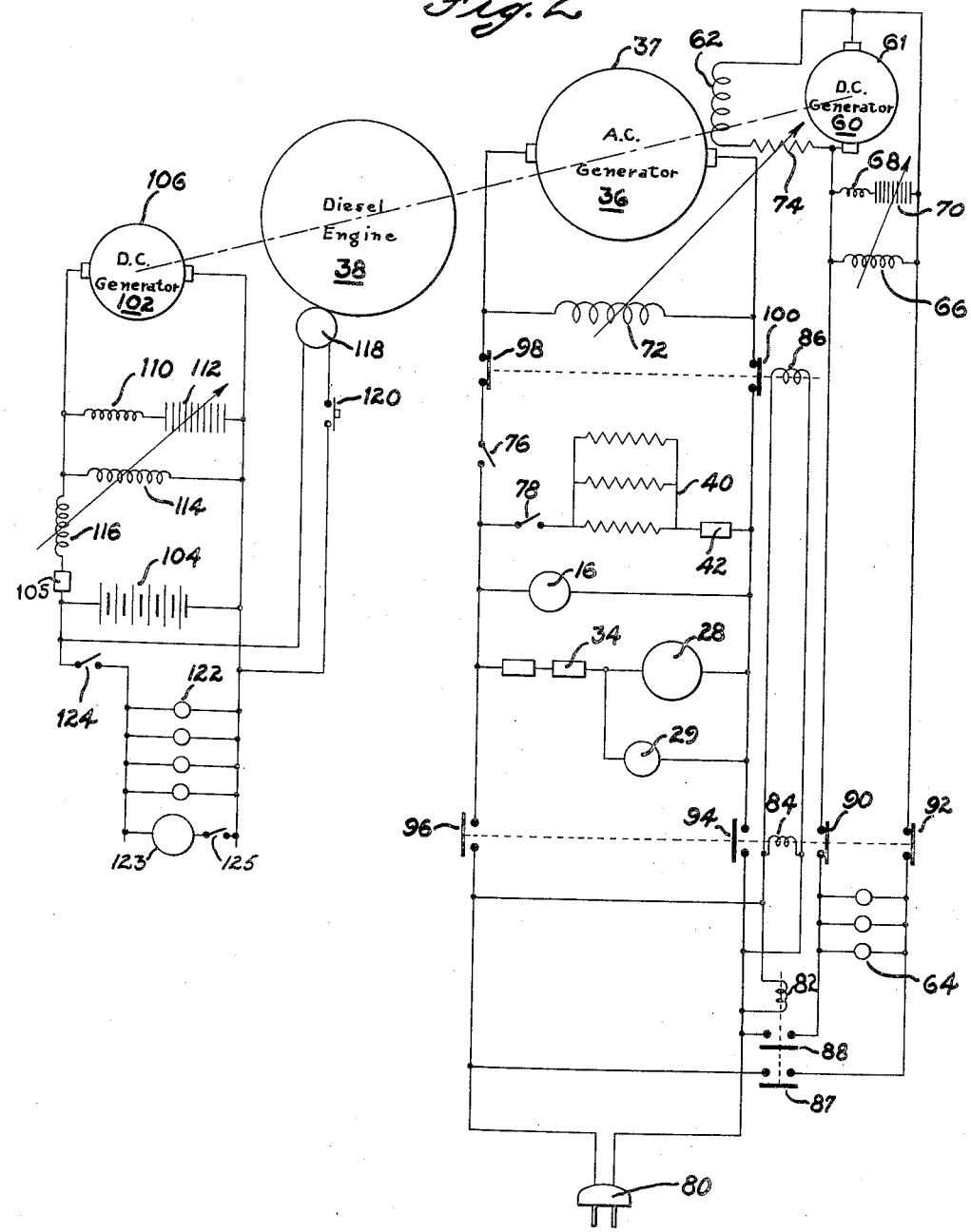

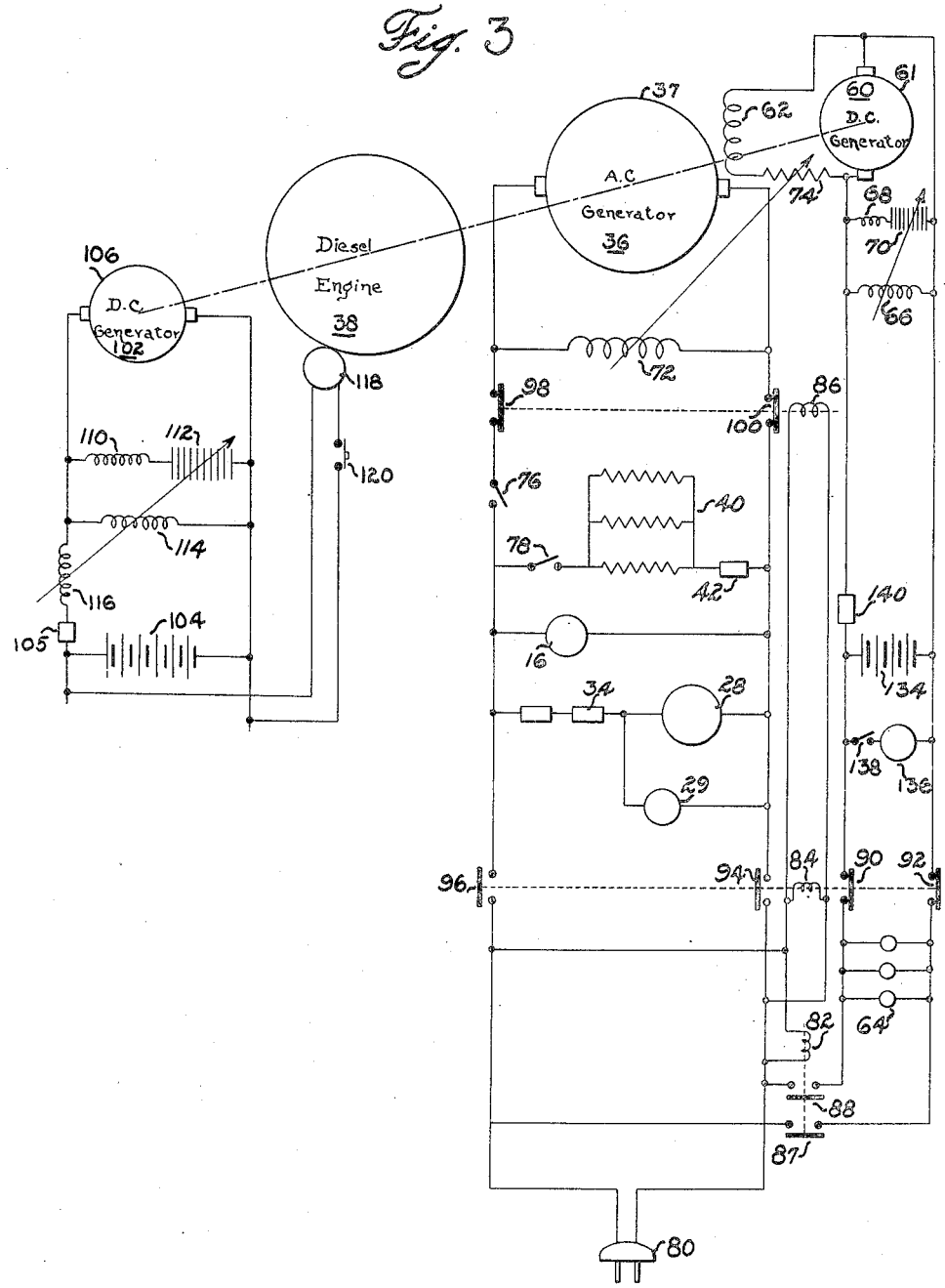

2,339,903

UNITED STATES PATENT OFFICE 2,339,903

REFRIGERATING APPARATUS

Donald F. Alexander, Dayton, Ohio, assignor to General Motors Corporation, Dayton, Ohio, a corporation of Delaware Application October 24, 1940, Serial No. 362,637

10 Claims. (Cl. 257—3)

This invention relates to refrigeration and more particularly to an improved refrigerating system for use on a railway car or the like.

One object of this invention is to provide an improved railway air conditioning system in which a Diesel engine or the like supplies all of the necessary electrical energy for lighting the car and for energizing the air conditioning and ventilating apparatus.

Another object of this invention is to provide a system in which the compressor motor may be started and stopped without causing the car lights to flicker.

Another object of this invention is to provide a refrigerating system and power unit which eliminates the necessity of providing the usual heavy weight storage batteries.

Another object is to provide an electrical circuit for the electric lights which require a constant impressed voltage and another electrical circuit for the electric motors and the heating elements which do not require a constant voltage.

Still another object of this invention is to provide a Diesel engine which supplies all of the necessary electrical power for all of the electrical equipment on the car including the compressor motor and electric car heaters, and which also supplies waste heat for use in conditioning the car air.

Another object of this invention is to provide means for energizing emergency lights which may be used at such times when the Diesel engine is not in operation, such as when passing through a tunnel or while standing in a station where no means is provided for plugging into an outside source of electrical energy.

Still another object of this invention is to utilize the usual exciter for energizing the car lighting circuits as well as the field of an alternator.

Further objects and advantages of the present invention will be apparent from the following description, reference being had to the accompanying drawings, wherein a preferred form of the present invention is clearly shown.

In the drawings:

Fig. 2 shows the wiring diagram for the apparatus shown in Fig. 1; and

Fig. 3 is a view similar to Fig. 2 showing a modified form of wiring diagram.

Figure 1:
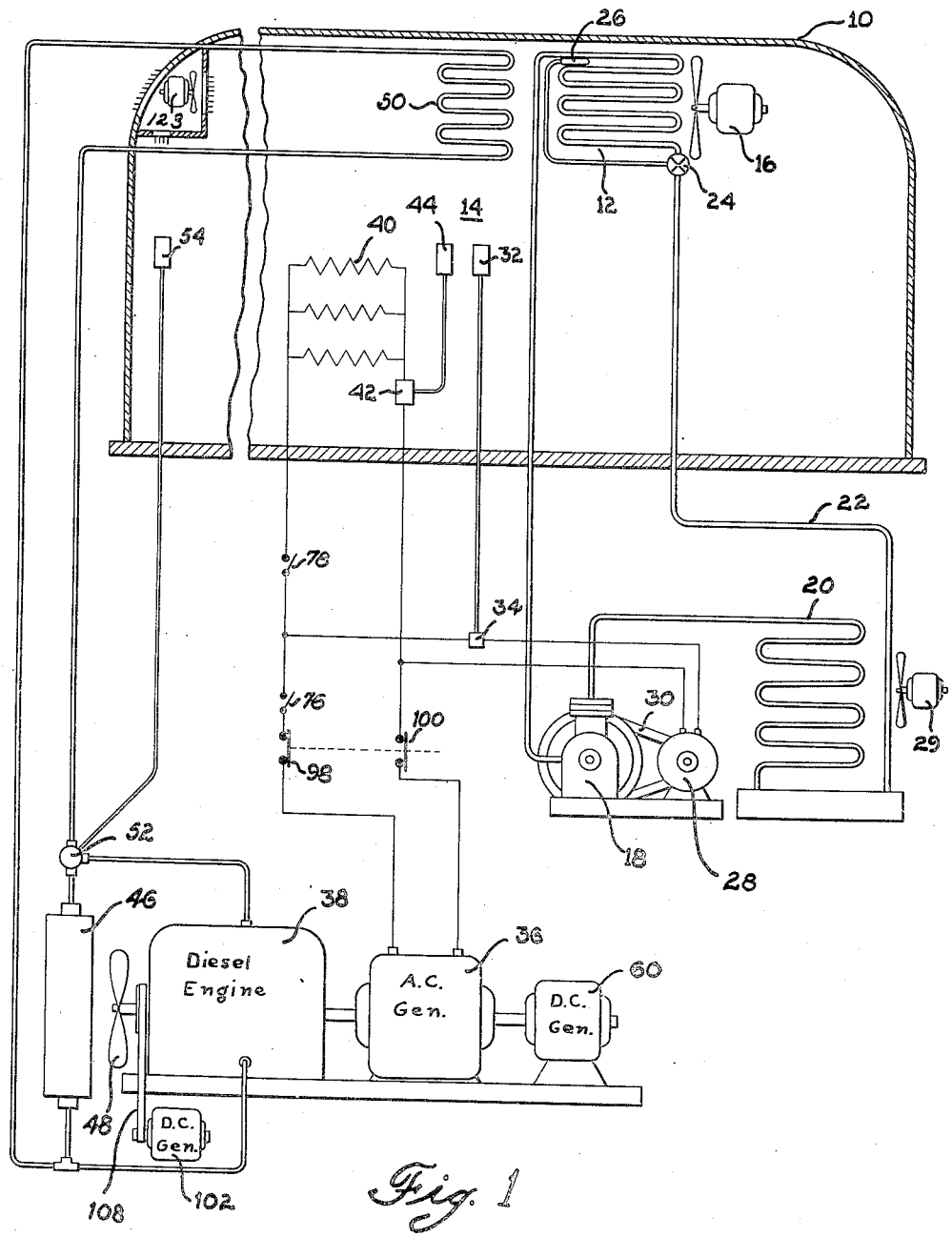
Fig. 1 is a diagrammatic view showing the relationship between the main power unit and the car air conditioning apparatus.

In designing systems for supplying the necessary electrical energy for operating the car lighting system, the control circuits, etc., and for supplying power for either heating or cooling the car air, it has usually been considered necessary to provide a large heavy duty battery for energizing the lights and the compressor motor. In order to eliminate the use of heavy duty batteries, it has been proposed to provide a large generator for supplying power for energizing the lighting circuits and also the car air conditioning apparatus, but this arrangement has not been fully satisfactory. In the former type of system, expensive heavy weight storage batteries have been required, in addition to a large number of expensive regulators, relays and the like which have not proven fully satisfactory under all operating conditions. In those systems in which a large sized generator has been provided for directly energizing both the lighting circuits and the air conditioning equipment, special voltage regulators and the like have been required and even then excessive light flicker has resulted whenever the air conditioning apparatus has been cut in or out of the circuit. In designing the system described hereinafter, all of these problems have been solved and at the same time the system has been simplified, and rendered more reliable in operation.

Referring now to the combination disclosed in Fig. 1, the reference numeral 10 designates a railway vehicle or the like, which is provided with a system embodying my invention. The air for the vehicle 10 is adapted to be conditioned by means of a conventional refrigerating system which comprises an evaporator 12, mounted directly within the conditioned space 14. Air is circulated over the evaporator 12 by means of a fan unit 16. The refrigerant vaporized in the evaporator 12 is compressed by the compressor 18 which discharges the compressed refrigerant into the usual form of condenser 20 wherein the refrigerant is condensed before returning to the evaporator through the line 22. The flow of refrigerant from the condenser 20 to the evaporator 12 may be controlled by the usual form of thermostatic valve 24, or any other suitable control means such as a fixed restrictor. In order to prevent liquid refrigerant from returning to the compressor, a thermostatic bulb 26 is provided for closing the expansion valve 24 when the liquid refrigerant reaches the outlet of the evaporator. Inasmuch as these details of the refrigerant system are all conventional, no further description of the refrigerating system need be given.

The compressor 18 is driven by means of an alternating current motor 28 which drives the compressor through the belt 30. The compressor motor 28 is started and stopped in response to temperature changes within the car. The thermostat 32, located in the conditioned space, is arranged to interrupt the circuit to the motor 28 by means of the switch 34. The electrical energy for operating the electrical motor 28 is supplied by the alternating current generator 36 which is driven by a constant speed Diesel engine 38. As shown in Fig. _, the alternating current generator 36 comprises an armature 37 and a field coil 62. In addition to supplying electrical energy for energizing the motor 28, the alternator 36 is also adapted to supply electrical energy to the heaters 40 which are used for heating the car during the winter season. The flow of current through the heaters 40, is controlled by switch unit 42 which, in turn, is under control of the thermostat 44 located directly within the compartment to be heated. The Diesel engine 38 is adapted to run continuously and is preferably of the type which has very close speed control so that sudden changes in load on the engine do not cause fluctuations in the speed of the engine.

The Diesel engine 38 is of the water cooled type and includes the usual form of radiator 46 for dissipating the heat generated by the Diesel engine. A fan 48 is adapted to circulate air over the radiator 46 in the usual manner. Inasmuch as there are times during the cooling season when it is desirable to reheat the air flowing over the evaporator 12, a separate reheating coil 50 is provided which may be supplied with a heating medium from the Diesel engine. The arrangement is such that waste heat from the Diesel engine may be dissipated through the reheat coil 50 in place of the usual engine radiator 46. During the heating season, the waste heat serves to heat the air flowing over coil 50. The three way valve 52 may be used for controlling the amount of heating fluid diverted from the engine radiator 46 to the coil 50. As shown in Fig. 1, the valve 52 is controlled by a thermostat 54 located within the compartment to be conditioned. The valve 52 may be the "on and off" type or may be a modulating type of valve.

As shown in Figs. 1 and 2, the Diesel engine 38 also drives an oversized exciter 60 which serves to generate direct current for exciting the field coil 62 of the alternator 36. The direct current generator 60 also generates current for energizing the main car lights 64. As shown in Fig. 2, the generator 60 comprises a rotor 61 and a field coil 68. The output of the direct current generator 60 is controlled by the voltage coil 66 which regulates the flow of current through the field coil 68 by means of the carbon pile rheostat 70. The flow of current through the field coil 62 of the main alternator is under control of the voltage coil 72 placed across the armature 37 of the alternator 36. The voltage across the coil 72 is used for varying the field resistance 74 which is arranged in series with the alternator field coil 62.

As shown in Fig. 2, the alternating current generator 36 supplies current to the electric heaters 40, the evaporator fan motor 16, the compressor motor 28 and the condenser fan motor 29. Manual switches 76 and 78 are provided for manually controlling the flow of current to the air conditioning apparatus and the electrical heaters 40.

In order to provide for emergency operation of the air conditioning apparatus in certain railway terminals where regulations prevent Diesel operation, means have been provided for energizing the air conditioning apparatus and the car lighting system from an outside source of alternating current. This means comprises a connector 80 which may be plugged into any suitable source of alternating current such as usually provided at all large terminals. Upon supplying current to the system through the plug 80, solenoids 82, 84 and 86 become energized. Energization of the solenoid 82 causes closing of the switches 87 and 88 thereby placing the car lighting system 64 in circuit with the outside source of electrical energy. While no transformer or rectifier has been shown between the source of outside current and the lights 64, it is obvious that either a transformer or a rectifier may be used if desired. The lights 64 may be of the type which can be used on either alternating current or direct current in which case no rectifier would be necessary. Energization of the relay 84 opens the switches 90 and 92 thereby disconnecting the car lights 64 from the direct current generator 60. Energization of the relay 84 also closes the switches 94 and 96 whereby the air conditioning apparatus is placed in circuit with the outside source of electrical energy. Energization of the solenoid 86 opens the switches 98 and 100 whereby the main alternating current generator 36 is disconnected from the electrical circuits of the air conditioning apparatus. By virtue of this arrangement, it is impossible to supply electrical energy to the air conditioning apparatus and the car lights 64 from both sources of electricity at the same time.

In order to provide a convenient means for starting the Diesel engine, a separate direct current generator 102 is provided for charging a small storage battery 104. The direct current generator 102 is driven by the Diesel engine 38 by means of belt 108 and comprises an armature 106 and a field coil 110. The flow of current through the field coil 110 is controlled by the carbon pile rheostat 112. The rheostat 112 is in turn under the combined control of the voltage coil 114 and the current coil 116. This type of control being well known in the art needs no further description. A conventional reverse current relay 105 is placed in circuit between the battery and the generator to disconnect the battery from the generator whenever the generator stops. The battery 104 is normally used only for energizing the Diesel engine starting motor 118 and may therefore be of light weight construction. Energization of the starting motor 118 is controlled by the usual push button 120 in circuit with the starter motor 118.

Inasmuch as there may be times when it is desirable to provide car lighting when neither the Diesel engine nor any outside source of current is available for use, emergency lights 122 have been provided which may be energized from the battery 104 by closing the manual switch 124.

The motor 16 depends upon operation of the main alternator 36 for its energization and therefore does not operate when the Diesel engine stops. Since it is desirable to provide some means for ventilating the car at such times as when the Diesel engine is not in operation, a separate ventilating unit 123 may be provided which may be energized from the storage battery 104, as shown in Fig. 2. Manual switch 125 may be used for manually starting and stopping the ventilating unit 123.

By virtue of the above described electrical system, it is apparent that the main car lighting system is energized from the constant speed generator 60 and that no other heavy duty electrical equipment is energized from this generator. With such an arrangement the voltage supplied to the lighting system remains substantially constant. This is important since lighting systems require a very constant voltage for proper operation. It is also apparent that the heavy duty electrical equipment energized from the alternating current generator 36 is all of such a nature that minor fluctuations in the voltage supplied from the generator 36 will have very little effect on the operation of the apparatus. As a consequence thereof, no complicated regulating means need be provided for closely regulating the output of the generator 36. This materially reduces the cost of the original equipment and also saves on the upkeep cost.

In Fig. 3, of the drawings, I have shown a slightly modified arrangement in which an additional battery 134 has been provided which may be used to supply electrical energy to the main car lighting system at such times when the Diesel engine 38 is not in operation. A conventional reverse current relay 140 has been provided between the battery and the generator 60 so as to disconnect the battery from the generator when the generator voltage drops below a predetermined value. Inasmuch as reverse current relays are well known in the art, the structural details thereof need not be described. The addition of the battery 134 in the main lighting circuit eliminates the need for the emergency lights 122 shown in Fig. 2. In the modification shown in Fig. 2, a ventilating unit 123 energized from the battery 104 is used for providing emergency ventilation whereas in the modification shown in Fig. 3, a corresponding unit 136 is provided which may be energized from the storage battery 134. Manual switch 138 has been provided in the circuit of the motor 136 for controlling the operation of the motor 136. Inasmuch as the rest of the circuit shown in Fig. 3 is identical with the circuit shown in Fig. 2, the same reference characters have been used to designate similar parts and it is to be understood that the apparatus shown in Fig. 3 functions in the same manner as the corresponding apparatus in Fig. 2.

In order to simplify this disclosure, all of the alternating current circuits have been shown as single phase circuits. However, it is within the purview of this invention to utilize polyphase circuits and equipment in lieu of the single phase circuits and equipment shown.

While the form of embodiment of the invention as herein disclosed, constitutes a preferred form, it is to be understood that other forms might be adopted, all coming within the scope of the claims which follow.

What is claimed is as follows:

1. Railway air conditioning and lighting apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said alternating current motor and said compressor, means for energizing said alternating current motor from said alternating current generator, lighting apparatus, and means for energizing said lighting apparatus from said direct current generator, said alternating current generator comprising a field coil also energized by said direct current generator.

2. Railway air conditioning and lighting apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said alternating current motor and said compressor, means for energizing said alternating current motor from said alternating current generator, lighting apparatus, means for energizing said lighting apparatus from said direct current generator, said alternating current generator comprising a field coil also energized by said direct current generator, and an outside source of electrical energy, means for energizing said alternating current motor and said lighting apparatus from said outside source of electrical energy when said alternating current generator is inoperable.

3. Railway air conditioning and lighting apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said alternating current motor and said compressor, means for energizing said alternating current motor from said alternating current generator, lighting apparatus, means for energizing said lighting apparatus from said direct current generator, said alternating current generator comprising a field coil also energized by said direct current generator, an outside source of electrical energy, means for energizing said alternating current motor from said outside source of electrical energy when said alternating current generator is inoperable, and means for energizing said lighting apparatus from said outside source of electricity when said direct current generator is inoperable to supply electrical energy to said lighting apparatus.

4. Railway air conditioning and lighting apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said alternating current motor and said compressor, means for energizing said alternating current motor from said alternating current generator, lighting apparatus, means for energizing said lighting apparatus from said direct current generator, said alternating current generator comprising a field coil also energized by said direct current generator, an outside source of electrical energy, means for energizing said alternating current motor from said outside source of electrical energy when said alternating current generator is inoperable, means for energizing said lighting apparatus from said outside source of electricity when said direct current generator is inoperable to supply electrical energy to said lighting apparatus, and means disconnecting said alternating current generator from said alternating current motor in response to energization of said alternating current motor from said outside source of electrical energy.

5. Air conditioning apparatus comprising in combination, an evaporator, means for circulating air to be conditioned in thermal exchange with said evaporator, a condenser, a compressor, refrigerant flow connections between said evaporator, condenser and compressor, a motor for driving said compressor, temperature responsive means for starting and stopping said compressor motor, a power source, a first generator operated by said power source, a second generator operated by said power source for exciting the field of said first generator, electrical means energized from said second generator, voltage regulating means for controlling the voltage output of said second generator, means for energizing said compressor motor from said first generator, electric heating means, means for energizing said electric heating means from said first generator, an outside source of electrical energy, means for energizing said compressor from said outside source of electrical energy, and means for disconnecting said compressor motor from said first generator upon energization of said compressor motor from said outside source of energy, said electrical means energized from said second generator comprising a storage battery and a lighting system.

6. In combination, a power source, an alternating current generator driven by said power source, a direct current generator driven from said power source, electrical means energized from said alternating current generator, electrical means energized from said direct current generator, said alternating current generator comprising a field coil energized from said direct current generator, an outside source of electrical energy, means for supplying electrical energy to both of said electrical means from said outside source of electrical energy, and means responsive to connection of said outside source of electrical energy to said electrical means for disconnecting said electrical means from said generators, one of said electrical means comprising a heating element and the other of said electrical means comprising a lighting element.

7. Air conditioning and lighting apparatus comprising in combination, a power source, an alternating current generator, a direct current generator, torque transmitting means between said alternating current generator and said power source, torque transmitting means between said direct current generator and said power source, an evaporator, means for circulating air to be conditioned for an enclosure in thermal exchange with said evaporator, a condenser, a compressor, refrigerant flow connections between said evaporator, condenser and compressor, an alternating current motor, torque transmitting means between said alternating current motor and said compressor, means for energizing said alternating current motor from said alternating current generator, means for lighting said enclosure by means of electrical energy from said direct current generator, said alternating current generator comprising a field coil also energized by said direct current generator, an outside source of electrical energy, means for energizing said alternating current motor from said outside source of electrical energy when said alternating current generator is inoperable, and means for lighting said enclosure by means of energy derived from said outside source of electrical energy when said direct current generator is inoperable.

8. Air conditioning and lighting apparatus comprising in combination, a power source, a main generator including a field circuit and an armature circuit, an auxiliary generator including a field circuit and an armature circuit, said generators being driven by said power source, electric power consuming means for conditioning air for an enclosure, electric lighting means for lighting said enclosure, means for supplying current from said auxiliary generator to said main generator field and to said lighting means, means responsive to the output of said auxiliary generator controlling the flow of current through the field circuit of said auxiliary generator, means for supplying current from said main generator to said air conditioning means, and means responsive to the output of said main generator controlling the flow of current from said auxiliary generator to the field circuit of said main generator.

9. An air conditioning and lighting system for an enclosure comprising in combination, a power source, a first generator driven by said power source, a second generator driven by said power source, electrically energized means for conditioning air for said enclosure, means for supplying electrical energy to said air conditioning means from said first generator, electric lighting means for said enclosure, and means for energizing said electric lighting means from said second named generator whereby changes in load on first named generator do not cause said electric lighting means to flicker, said first named generator comprising a field coil, and means for supplying energy from said second named generator to said field coil.

10. A heating, cooling and lighting system for an enclosure comprising in combination, a constant speed internal combustion engine, a first generator driven by said engine, a second generator driven by said engine, means for heating air for said enclosure by means of electrical energy supplied by said first generator, means for cooling said enclosure, means for supplying electrical energy for said first generator to said means for cooling said enclosure, electric lighting means for said enclosure, and means for energizing said electric lighting means from said second named generator whereby changes in load on said first named generator do not cause said electric lighting means to flicker.

DONALD F. ALEXANDER.